INVENTOR.
GLENN A. MARSH

ATTORNEY.

United States Patent Office 3,436,320
Patented Apr. 1, 1969

3,436,320
METHOD AND APPARATUS FOR DETERMINATION OF REDOX CURRENT IN REDOX SOLUTIONS
Glenn A. Marsh, Crystal Lake, Ill., assignor, by mesne assignments, to Union Oil Company of California, Los Angeles, Calif., a corporation of California
Continuation-in-part of application Ser. No. 322,281, Nov. 8, 1963. This application May 20, 1965, Ser. No. 457,453
Int. Cl. B01k 3/02
U.S. Cl. 204—1
13 Claims

ABSTRACT OF THE DISCLOSURE

A method and apparatus for determining the redox current and the corrosion current in a redox solution comprising applying less than about 0.03 volt to electrodes comprised of a corrodible metal to be tested and a reference electrode, applying the same D.C. voltage to an inert electrode and a reference electrode and measuring the currents.

---

This application is a continuation-in-part of application Ser. No. 322,281, filed Nov. 8, 1963, and said application is incorporated herein by reference.

This invention relates to method and apparatus for determining redox current in a redox liquid and for using such determination to obtain more accurate determinations of corrosion rates of metals in contact with such solutions and for determining the metal ion concentration of the reduced solute.

In the aforesaid application Ser. No. 322,281 there is disclosed method and apparatus for determining the instantaneous corrosion rate of metals in contact with corrodible conductive solutions. In this method a D.C. voltage less than about 0.03 volt is applied between electrodes of the same metal whose corrosion rate is being determined, immersed in the solution, the polarity of the potential applied between the electrodes is then reversed, and the corrosion rate is determined from the magnitude of the current measured in each direction.

The method disclosed in Ser. No. 322,281 is accurate for nonredox systems, such as ordinary brine containing mixed chlorides, such as calcium and magnesium. But if other ions, such as sulfide, ferrous, ferric, cuprous or other readily oxidized or reduced ions, are present in the corroding environment, the redox current can be appreciable fraction of, or even greater than, the corrosion current, thus introducing an error. In measuring the effect of corrodents such as oil well brines, water for use in secondary recovery of oil, and recirculating cooling water, the correction for redox current can be very important. Furthermore, it is frequently important to determine the concentration of a reduced ion in the corrodible environment, such as the concentration of ferrous ions in water.

It is an object of this invention to provide a method and apparatus for determining the redox current of redox solutions.

It is another object of this invention to provide a method and apparatus for correcting corrosion current measurements in order to obtain more accurate corrosion rates.

It is a further object of this invention to provide a method and apparatus for determining the concentration of reduced ions in a solution.

Figure 1:
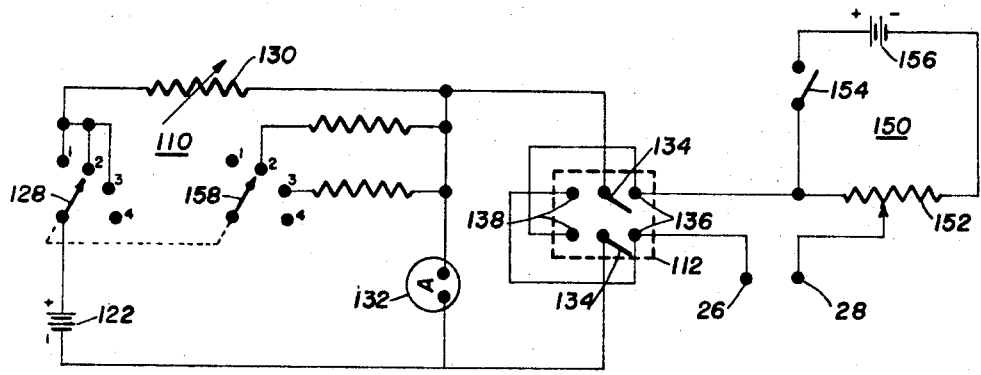
Figure 2:
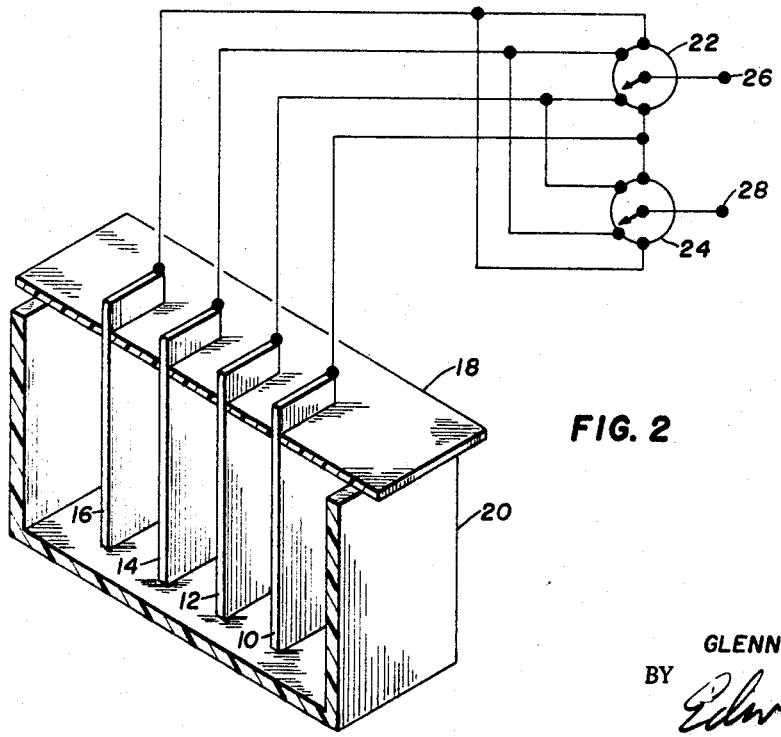
Figure 3:
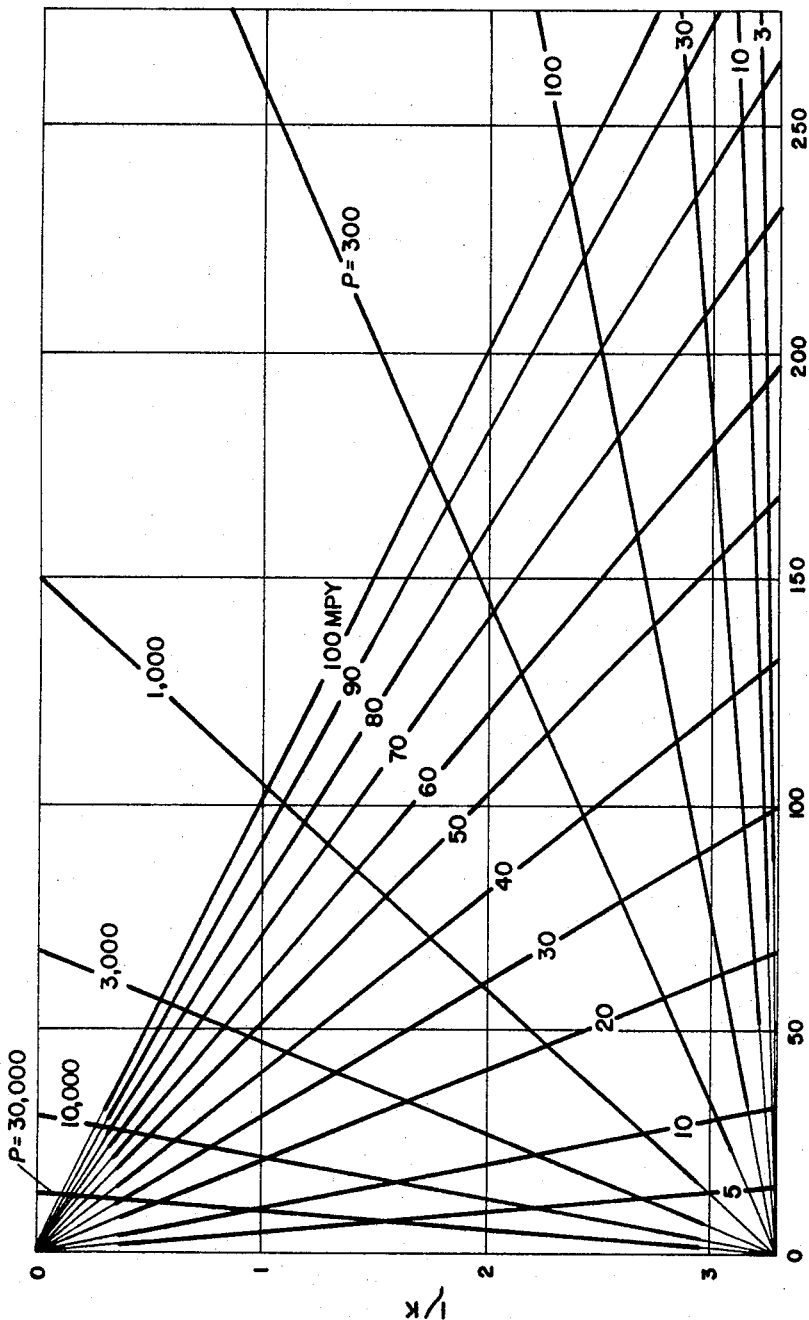
Figure 4:
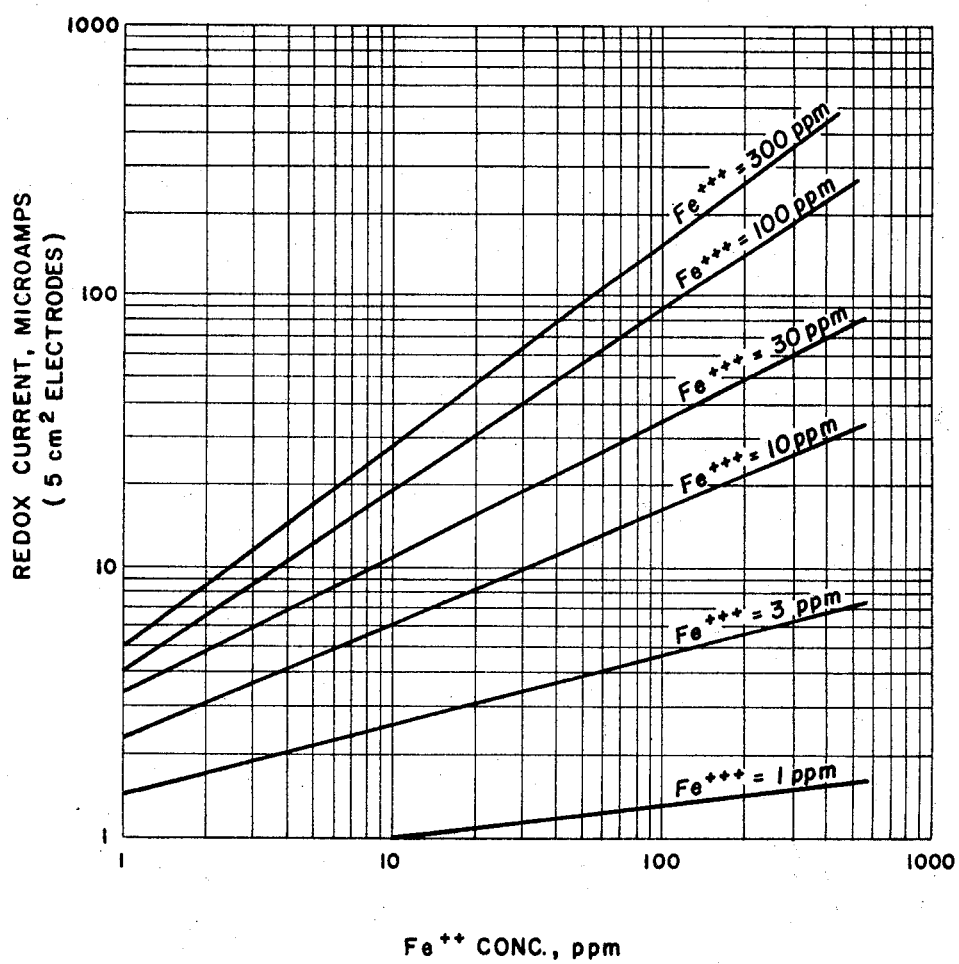

Other objects will become apparent from the following description and drawings, of which FIGURE 1 is a schematic view of an electrical circuit for carrying out the invention; FIGURE 2 is an isometric view of an electrode arrangement useful in carrying out the invention; FIGURE 3 is a calibration chart from which corrosion rates can be determined from current measurements; and FIGURE 4 is a calibration chart from which ferrous ion concentration can be determined after measuring redox current.

As set forth in the aforesaid application Ser. No. 322,281, the corrosion rate of a metal in a corrosive, electrically conductive environment is determined by disposing in the corrosive environment a plurality of spaced electrodes fabricated of the metal of which the corrosion rate is to be determined, applying between a pair of the electrodes a D.C. potential having a known value of less than about 0.03 volt, and measuring the current flow which takes place between the pair of electrodes during the time the potential is applied. The D.C. potential which is applied between the pair of electrodes is preferably about 0.02 volt since nonlinearity of the function $$\frac{\Delta L}{\Delta E}$$

(measured current divided by applied voltage) with corrosion rate may result if the applied potential is too high. A D.C. potential of opposite polarity and having a known value of less than about 0.03 volt is then applied between the pair of electrodes and the current flow which takes place between the pair of electrodes during the time the second potential is applied is measured. Finally, the corrosion rate of the metal is determined from the magnitudes of the potentials and measured currents.

In this "dual electrode" method, two substantially identical electrodes are used, and the instantaneous corrosion rate is approximated by measuring the current needed to effect a difference of less than about 0.03 volt in the potential of the electrodes. It will be noted that the potential is measured between the two electrodes rather than with reference to a reference electrode. Current passing between the electrodes depresses the potential of one of them and elevates the potential of the other from the freely corroding potential. An averaging system is desirable since the electrode potentials of two substantially identical pieces of metal may be quite a few millivolts apart when the electrodes are immersed in the same electrolyte. Current is first passed through the electrodes in one direction and the $\Delta I$ required to move the potentials less than about 0.03 volt apart is noted. Then the current is reversed and the new $\Delta I$ is noted. U.S. Patent 3,069,332 discloses a somewhat similar method.

In order to accurately convert current to common units of corrosion rate, a calibration is needed in which the corrosion rates are measured by another means at the same time as $\Delta I$ measurements are being made. In addition, a correction must be made for an IR drop which arises proportional to the current flowing between the electrodes. The measured potential difference, which is preferably about 0.02 volt, is equal to the sum of the desired polarization changes at the anodic and cathodic surfaces, plus unwanted IR drops at these surfaces and through the electrolyte.

The calibration is based on Equation 1 for the dual electrode modification:

(1)
$$I_{corr.} = \frac{2B\Delta I}{2.3\Delta E}$$

where B is a constant. It is convenient to hold $\Delta E$ constant. The quantity of $\Delta I$ itself is a measure of relative corrosion rate, but if desired it can be converted to common units of corrosion rate by appropriate conversion factors. A convenient conversion for steel is $2.2 \times 10^{-6}$ amperes/cm.$^2$/mil per year corrosion rate. Equation 1 uncorrected for solution resistivity then becomes:

(2)
$$U = \frac{2B\Delta I}{2.3(\Delta V)(2.2\mu a/cm.^2)A}$$

where U is corrosion rate in mils per year, $\Delta I$ is the measured current in microamperes, $\Delta V$ is the applied voltage in volts, and A is the electrode area in cm.²

Equation 2 for determining the corrosion rate may be simplified as:

$$(3) \qquad U = K' \frac{\Delta I}{\Delta E}$$

where K' is a constant "calibration factor" for a specific system since it includes the value of B of the metal from which the electrodes are fabricated and the electrode area. However, since $\Delta E$ is preferably held constant at 0.02 volt, K' can also include the value of 0.02 volt for $\Delta E$, thereby permitting further simplification of Equation 2 to:

$$(4) \qquad U = K \Delta I$$

Referring to FIGURE 2, electrodes 10 and 12 may be fabricated of the same metal to be tested or one may be the metal to be tested, such as steel, and the other a more easily corroded metal, such as zinc. Electrodes 14 and 16 may be identical inert electrodes, such as carbon or platinum, or one may be a more easily corrodible electrode, such as zinc, and the other inert. The electrodes are supported by electrically insulating cover 18 and extend downward into vessel 20, which is adapted to contain a redox corrosive environment. Each electrode is connected to a terminal of switch 22 and a terminal of switch 24, so that by appropriate action of the switches, terminals 26 and 28 may be connected across any selected pair of the electrodes.

Referring to FIGURE 1, circuit 150 consists of potentiometer 152, switch 154 and D.C. potential source 156. Potentiometer 152 is preferably a 0–50 ohm helical potentiometer, the slide of which is connected directly to electrode 116, while potential source 156 may be a dry cell having an E.M.F. of 1.5 volts.

Circuit 110, which is connected to movable contacts 134 of reversing switch 112, includes 9 volt D.C. potential source 122, switch 128, resistor 130 consisting of 0.1 megohm variable resistance, a 1 megohm variable resistance and a 15 kilohm resistance, and ammeter 132. Switch 128 is preferably one pole of a double-pole quadruple-throw switch, with switch 158 representing the second pole. Switches 128 and 158 are placed in positions 1 when ammeter 132 is used without a shunt and in positions 2 and 3 when shunts for currents 0–100 microamperes and 0–200 microamperes, respectively, are to be connected across ammeter 132. The aforesaid values for the various components of the circuit are given by way of specific example. Components of other values may be used. Circuit 110 is opened by placing switches 128 and 158 in positions 4. Terminals 26 and 28 are the same terminals described in connection with FIGURE 2.

In operation, switches 128 and 158 are moved to positions 4 to open circuit 110, and then switch 154 is closed and potentiometer 152 is adjusted so that circuit 150 applies a direct current between two electrodes 10 and 12 or 14 and 16, or to counter the current flow between the electrodes, i.e., until meter 132 reads 0 current. Switch 154 is left closed and with contacts 134 of switch 112 in positions 136 and switch 128 closed, the variable resistance of resistor 130 is adjusted to bring the pointer of meter 132 to a predetermined point on the scale thereof corresponding to 0.02 volt across the meter. Since meter 132 has an internal resistance of 2,000 ohms, resistor 130 is adjusted until meter 132 reads to 10 microamperes, by the application of Ohm's law. Meter 132 is used as a voltmeter in this operation. The contacts 134 of switch 112 are then moved to a position between positions 136 and 138 to disconnect electrodes 10 and 12 from circuit 110 so that the entire current, including the portion thereof that went through the electrolyte, goes through ammeter 132. The new reading on ammeter 132 is noted. The current which flowed through the electrodes is then the new reading on ammeter 132 minus the reading of 10 microamperes. The contacts of switch 112 are then moved to positions 138 and the above-described procedure is repeated. The current reading thus obtained is averaged with the previous reading.

The same procedure is then repeated after electrodes 14 and 16 are connected in the circuit in place of electrodes 10 and 12 by means of switches 22 and 24. The corrosion rate is determined from the difference between the averaged current readings with the two sets of electrodes.

The method of this invention can be carried out using an ammeter as the only meter. It will be apparent that the current measured when the electrodes are disconnected from the system will only be substantially, not exactly, the current which flows between the electrodes during the time the voltage is applied. However, this error is minor due to the high resistance value of resistor 130 as compared to the apparent resistance of the electrodes. More specifically, resistor 130 will have a resistance of about 10 to 30 times the resistance of the system being investigated. It will be obvious that the exact current flowing between the electrodes can be calculated from the current reading on meter 132 by Ohm's law, if desired, provided the exact value of resistor 130 and E.M.F. source 122 are known.

Current can be accurately converted to common units of corrosion rate by utilizing a calibration chart. As hereinbefore pointed out, Equation 2 for determining corrosion rate is uncorrected for solution resistivity. When current flows between the electrodes, the measured potential difference, which is preferably constant at 0.02 volt, is equal to the sum of the desired polarization changes at the anodic and cathodic surfaces, plus unwanted IR drops at these surfaces and through the electrolyte.

If $\Delta E_c$ represents the true polarization change and the potential difference is held at 0.02 volt, then $$(5) \qquad \Delta E_c = 0.02 - \Delta I(R)$$

where R represents a function of the resistivity of the electrolyte. Equation 2 corrected for IR drop is then $$(6) \qquad U = \frac{2B \Delta I}{(2.3)(2.2) A \ 0.02 - \Delta I(R)}$$

Assuming that the electrode area is 5 cm.² and using a value of 0.075 for B (the best value of B for steel in neutral solutions), Equation 6 becomes $$(7) \qquad U = \frac{0.0059 \Delta I}{0.02 - \Delta I(R)}$$

The coefficient of $\Delta I$ is the "calibration factor" K, $$(8) \qquad K = \frac{0.0059}{0.02 - \Delta I(R)}$$

or, in a more convenient form, $$(9) \qquad 1/K = 3.3 \frac{R}{0.0059} \Delta I$$

K can then be evaluated by obtaining the corrosion rate of twin probe electrodes, using the electrical resistance method of the prior art.

Since prior art corrosion measurement techniques, including methods such as the weighing of coupons, or the use of electrical resistance corrosion probes, measure the extent of corrosion over a given period of exposure, rather than an instantaneous corrosion rate, correlation of the results obtained by the method of this invention with the results of other corrosion measurement techniques requires something more than direct comparison. For example, an electrical resistance corrosion probe exposed to a corrosive environment for a period of 10 days will indicate an extent of corrosion which, when consideration has been made for the time factor, will produce an average corrosion rate figure of, say, 20 milliinches per year. This, however, is an average figure, and, in practice, the corrosion rate at any instant during the ten day period, such as after the elapse of 24 hours, might be something different from the average of 20 milliinches per year. In accordance with this invention, however, a method has been devised by which correlation can be made between the instantaneous corrosion rates measured in accordance with the method of this invention, and average corrosion rates measured in accordance with methods of the prior art.

In accordance with this method, a corrosive environment is established in an apparatus such as that shown in FIGURE 2, and a prior art corrosion measuring device, preferably an electric resistance type corrosion probe such as described in U.S. Patent No. 2,987,685 to Edward Schaschl, is also exposed to the corrosive environment. At regular periodic intervals the extent of corrosion, as detected by the prior art corrosion probe, is measured and recorded, while the instantaneous corrosion rates, or more precisely, $\Delta I/\Delta E$, are measured in accordance with the method of this invention. Measurements may be made, for example, every day for a period of a week, or every hour for a period of several hours. The total corrosion measurements recorded are then plotted as a function of time to produce a curve. The total cumulative corrosion at any instant is represented by the height of the curve above the time axis. The time rate of corrosion is, of course, proportional to the slope of the curve, and ordinarily will not be constant. However, the slope of the curve at any given point has some finite value representing the instantaneous corrosion rate at that time. Thus, it is possible to compare the instantaneous corrosion rates calculated in accordance with the method of this invention with the slope of the curve produced from a number of total corrosion extent measurements made over a period of time. Again, the comparison may be made graphically or analytically. For example, by known mathematical techniques the equation corresponding to the aforesaid time-corrosion may be determined, and differentiated with respect to time. This differential equation may then be solved for any time to determine the instantaneous corrosion rate. The equation, of course, will be solved for some time instant at which measurement of the $\Delta I/\Delta E$ ratio was made. Since corrosion rate$=K\Delta I$ at constant $\Delta E$, and since the corrosion rate can be determined graphically or from the differential equation of the corrosion-time curve, the equation can readily be solved for a value of K which will correlate the results obtained by the method of this invention with prior art corrosion measuring techniques. Preferably, the corroding elements of two prior art resistance-change corrosion probes will be used as the electrodes for the instantaneous corrosion rate measurement, during calibration tests, to insure that identical corrosion rates are measured and compared.

Using Equation 4, a tentative value of K can then be found as the proportionality constant between each measured corrosion rate and the corresponding $\Delta I$. Next, for a given resistivity of corrodent, $1/K$ is plotted against $\Delta I$ for various corrosion rates, since from Equation 9 such a plot yields a straight line having a slope of R/0.0059 and passing through $1/K$ at 3.3 when $\Delta I=0$. Curves representing $1/K$ vs. $\Delta I$ can be plotted from the K and $\Delta I$ data obtained with solutions of different compositions, and the slopes of these curves used to calculate R. R values for NaCl solutions of different compositions are given in the following table.

TABLE.—COMPOSITION, RESISTIVITY, AND R[1] OF AERATED NaCl SOLUTIONS

| Composition, percent NaCl | Resistivity, ohm-cm. | R, experimental, ohms | R, calculated,[2] ohms |
|---|---|---|---|
| 0.001 | 40,000 | 1,900 | 1,950 |
| 0.01 | 4,400 | 470 | 395 |
| 0.03 | 2,000 | 150 | 225 |
| 0.1 | 480 | 112 | 75 |
| 0.3 | 170 | 32 | 35 |
| 1.0 | 52 | 15 | 14 |
| 10.0 | 7 | 3 | 3 |

[1] A function of resistivity.
[2] Calculated from a smooth curve fitted to the data of R experimental.

Once R is known, a calibration curve, which can be used to convert any reading of $\Delta I$ into corrosion in terms of *mpy*, can then be constructed. To construct such a calibration curve, $1/K$ is plotted against $\Delta I$ for a given resistivity. The calibration curve passes through $1/K$ at 3.3 when $\Delta I$ is 0 and has a slope of $-R/0.0059$.

FIGURE 3 is a calibration curve for various resistivities ($\rho$), from $\rho=3$ to $\rho=30{,}000$ ohm-cm. The reciprocal of K is plotted as ordinate and $\Delta I$ as abscissa. The lines of negative slope are lines of constant corrosion rate, while the lines of positive slope are lines of constant electrolyte resistivity. The tie-lines are drawn in by connecting the origin with ponts along the line $1/K=1$, since $\Delta I$ is numerically equal to *mpy* along this line. The chart is applicable for steel electrodes of 5 square cm. area spaced 1 cm. apart in aqueous systems having a pH in excess of about 5, with an applied potential of 0.02 volt. It will be noted that the effect of a change of electrolyte resistivity upon measured corrosion rate is great at high resistivities and high corrosion rates, and small at low resistivities and low corrosion rates.

The electrodes used in the apparatus and method of this invention are of any electrically conductive material, e.g., metal or alloy. They may be of any convenient size and shape, and it is best that they be rigidly mounted in substantially parallel relationship. The electrodes may be mounted on pipe plugs or other fittings to permit their installation in pressure vessels, pipes, and the like, or they may be also constructed in such a way as to permit them to be driven into the soil. The exposed areas of the electrodes must be known, since this area enters into the calculation of the corrosion rate.

Once the electrodes have equilibrated with the corrodent, a process requiring a few minutes up to 2 days, the current readings can be made within a relatively short time (i.e., within about 20 seconds) after the potential is applied between the electrodes to obtain reproductible results. It is preferred to wait at least about 5 seconds after the potential is applied since there is some drift of current, the greatest part of which takes place during about the first 5 seconds. Preferably, an excess potential, e.g., about 2 to 5 times greater than $\Delta E$, is initially applied between the electrodes and the applied potential is then almost immediately reduced to $\Delta E$ to reduce the current drifting time.

When it is desired to determine the dissolved concentration of a reduced ion it is necessary only to determine the current applied to two inert electrodes, such as platinum electrodes.

Before making the current determination the solution is acidified, preferably with HCl or with an acid corresponding to the anion of the compound, the cation concentration of which is to be determined. A known amount of the oxidized cation salt is added to the solution and the current then measured. From a calibration chart for the particular system under study, such as that shown in FIGURE 4, the reduced form of the cation concentration can be read off. The data for FIGURE 4 were obtained by observing the current that passes through two platinum electrodes of 5 cm.$^2$ area each, upon application of a potential of 0.02 v. The current, as shown in FIGURE 4, is a function of the concentration of both ferrous and ferric ions.

As a specific example of the invention when used to correct for instantaneous corrosion determination, four electrodes, two being steel corresponding to the steel the corrosion rate of which is to be determined, and two being platinum, are placed in a corrosive environment, such as brine solution. The electrodes have an outside surface area of 5 square cm. and each pair is spaced apart a distance of .5 to 1 cm. The electrodes are cylindrical rod-shaped but can be any other shape, but in order to simplify calculations all electrodes should be of the same exposed area. The electrodes are allowed to stand in the corroding medium for at least a few minutes prior to making the electrochemical measurements.

A potential of 0.02 volt is applied between the two platinum electrodes and the resulting current is read on the microammeter. By means of the reversing switch 112 the applied potential is reversed and the current again noted. The average of the two currents is the redox current.

By means of switches 22 and 24 the circuit is connected across the two steel electrodes. The current is determined and then the polarity reversed similarly as done with the platinum electrodes and the current again determined. The resulting average constitutes the total current. By subtracting the redox current from the total current the corrosion current is obtained.

Instead of using a pair of similar corrodible electrodes and a pair of inert electrodes, the correction for redox current can be obtained by using a three-electrode system in which one electrode corresponds to the steel, the corrosion rate of which it is desired to determine, the second of which is a zinc electrode and the third of which is a carbon or platinum electrode. It will be understood that any metal, such as magnesium, which corrodes at a substantially faster rate than steel in the particular corrodent may be used in place of zinc. Preferably, such metal should corrode at least twice the rate of the metal being studied and most preferably as much as ten times the rate. After equalizing the potentials of the zinc and steel electrodes relative to the corroding environment by means of the compensating circuit, as previously described, a potential of 0.02 volt is applied and the current noted. This is the total current. The zinc/steel circuit is interrupted and the zinc/carbon electrodes connected into the circuit. The zinc/carbon potentials are equalized and then 0.02 volt is applied and the current again noted. This is the redox current. The corrosion current is the difference between the total current and the redox current. It will be understood that any inert noble metal electrode, such as gold, can be used instead of carbon or platinum, or the inert electrode can be of an alloy that is passive in the particular corrodent. However, platinum is preferred since it is more readily cleaned than most other metals or alloys, thus giving more reliable results.

While it is not necessary to reverse the polarity of the current in using the three-electrode system, in order to get the average total and average redox current it is essential to do this when using the so-called four-electrode system consisting of duplicate corrodible electrodes and duplicate inert electrodes. Regardless which system is used, it is immaterial in which order the total current and redox current are obtained.

While I have described a three-electrode system, it will be evident that instead of using a single zinc electrode for determining both total current and redox current, two separate zinc electrodes may be used, but the result is the same as when a single zinc electrode is used.

As a specific example of the invention when applied to the method for determining the dissolved reduced ion concentration, a brine solution containing ferrous chloride is acidified by means of hydrochloric acid to a pH below 3. Ferric chloride is added to the solution to give a known ferric ion concentration of 300 parts per million. Although in this example 30 p.p.m. of ferric chloride is added, the amount may vary within wide limits, for example, 10 to 1,000 p.p.m. The redox current is then determined by means of a pair of platinum electrodes the same as those previously described in connection with correction of corrosion circuit. The circuit and electrode structure described in connection with FIGURES 1 and 2 is used and a potential of 0.02 volt is applied between the platinum electrodes. The current is noted and by applying it to the chart FIGURE 4 the ferrous ion concentration in parts per million can be determined.

This method of determining reduced cation concentration is very sensitive, especially in the dilute region. The method is simple, fast and readily adaptable to field use, and there does not appear to be any interference from other substances.

The theory behind measurement of cation concentration in accordance with this method may be briefly explained as follows.

If a reducible substance is present in a solution, at any given potential a passive electrode will permit a finite rate of reduction of the reducible substance to occur on its surface. The rate of reduction at the surface of the electrode will depend upon the potential. But the rate of reduction is equivalent to a current.

In like manner, if an oxidizable substance is present there will be a rate of oxidation corresponding to the potential of the passive electrode.

Now if the reducible and oxidizable substances are merely oxidized and reduced forms of the same ion, there will be some potential at which the two rates are equal. The hypothetical redox current at this potential is called the exchange current. It will be noted that the redox current is measured on inert or passive electrodes whereas the desired redox current is that which flows on the corroding electrode. It is assumed that the redox current on electrodes of different materials will be in the same order of magnitude, though not necessarily identical.

The embodiments of the invention in which an exclusive property or privilege is claimed are defined as follows:

1. The method of correcting for corrosion current in a redox liquid to which a corrodible metal is exposed comprising obtaining the total current in the system by applying a D.C. voltage of less than about 0.03 volt between a reference electrode and an electrode inert to corelectrode immersed in said liquid, determining the redox current in said system by applying the same voltage between a reference eelctrode and an electrode inert to corrosion immersed in said liquid and determining the difference between said two currents.

2. The method in accordance with claim 1 in which both reference electrodes are composed of a substance from the group consisting of metals and alloys which corrode at a substantially faster rate than the corrodible metal electrode.

3. The method in accordance with claim 2 in which the corrodible metal is steel, the reference electrode in each case is zinc and the inert electrode is platinum.

4. The method of claim 2 in which the reference electrode in each case is zinc.

5. The method in accordance with claim 1 in which the first-mentioned reference electrode is made of the same metal as the corrodible electrode and the second-mentioned reference electrode is of the same material as the inert electrode.

6. The method in accordance with claim 5 in which the first-mentioned electrode is steel and the inert electrode is selected from the group consisting of platinum and carbon.

7. In a method of determining the reduced metal ion concentration in a redox solution comprising acidifying the solution to a pH below 3, dissolving a known amount of a compound of said metal in the oxidized state in said solution, applying a D.C. voltage of about 0.01 to 0.03 volt to spaced inert electrodes immersed in said solution, and measuring the resulting current.

8. The method in accordance with claim 7 in which the reduced metal ion is $Fe^{++}$ and the compound of the metal added to the solution is ferric chloride.

9. The method in accordance with claim 7 in which the spaced electrodes are platinum electrodes.

10. Apparatus for determining the redox current of a redox solution comprising a corrodible electrode made of metal to be tested, an electrode inert to corrosion by said solution, at least one electrode made of metal which corrodes at a substantially faster rate than said metal to be tested, an electric circuit, means for applying a D.C. voltage between about 0.01 and 0.03 volt to said circuit, switching means in said circuit whereby said circuit can be connected to the faster corroding metal electrode and either the test electrode or the inert electrode, and switching means for reversing the polarity of the potential applied to said electrodes.

11. Apparatus for determining the rate of corrosion in an electrolytic system comprising a plurality of electrodes comprising at least two electrodes made of a metal whose corrosion rate is to be determined, at least two electrodes made of a conductive material inert to corrosion by the electrolyte in said system, an electric circuit, means for impressing D.C. potential of about 0.01 to 0.03 volt in said circuit, switching means for connecting said circuit either to a pair of said first-mentioned electrodes or to a pair of said second-mentioned electrodes.

12. Apparatus for determining the redox current of a redox solution comprising a corrodible electrode made of metal to be tested, an electrode inert to corrosion by said solution, at least one electrode made of metal which corrodes at a substantially faster rate than said metal to be tested, an electric circuit, means for applying a D.C. voltage between about 0.01 and 0.03 volt to said circuit, and switching means whereby said circuit can be connected to the faster corroding metal electrode and either the test electrode or the inert electrode.

13. The apparatus of claim 12 comprising a corrodible electrode of steel, a zinc electrode which corrodes at a substantially faster rate than the steel electrode, and an inert electrode selected from the class consisting of platinum and carbon.

References Cited

UNITED STATES PATENTS

| 3,069,332 | 12/1962 | Seyl | 204—1.1 |
| 3,082,160 | 3/1963 | Sabins | 204—96 |
| 3,098,801 | 7/1963 | Marsh et al. | 204—195 |
| 3,250,689 | 5/1966 | Seyl | 204—1.1 |

JOHN H. MACK, *Primary Examiner.*

T. TUNG, *Assistant Examiner.*

U.S. Cl. X.R.

204—195; 324—29, 71

UNITED STATES PATENT OFFICE
CERTIFICATE OF CORRECTION

Patent No. 3,436,320  April 1, 1969

Glenn A. Marsh

It is certified that error appears in the above identified patent and that said Letters Patent are hereby corrected as shown below:

Column 8, line 26, beginning with "1. The method" cancel all to and including "said two currents." in line 35, same column 8, and insert:

1. The method of correcting for corrosion current in a redox liquid to which a corrodible metal is exposed comprising obtaining the total current in the system by applying a D.C. voltage of less than about 0.03 volt between an electrode of the corrodible metal and a reference electrode immersed in said liquid, determining the redox current in said system by applying the same voltage between a reference electrode and an electrode inert to corrosion immersed in said liquid and determining the difference between said two currents.

Signed and sealed this 7th day of April 1970.

(SEAL)
Attest:

EDWARD M. FLETCHER, JR.
Attesting Officer

WILLIAM E. SCHUYLER, JR.
Commissioner of Patents